May 12, 1931. C. B. FRITTS 1,804,761
BUMPERETTE TRUNK RACK
Filed Aug. 6, 1930
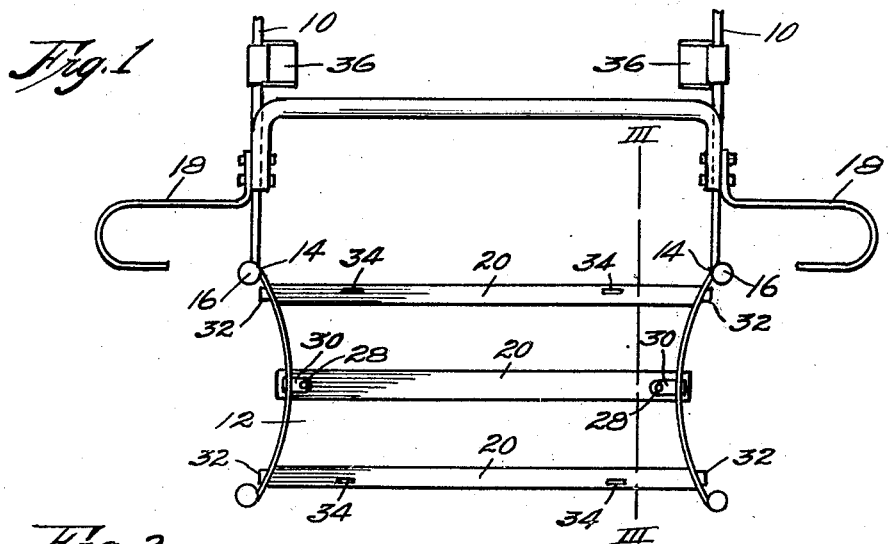
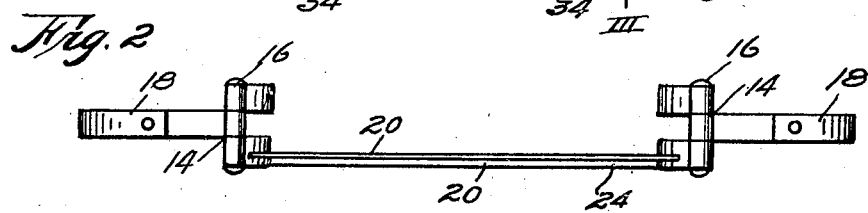
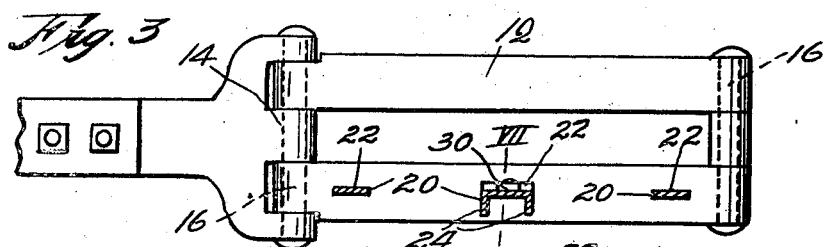
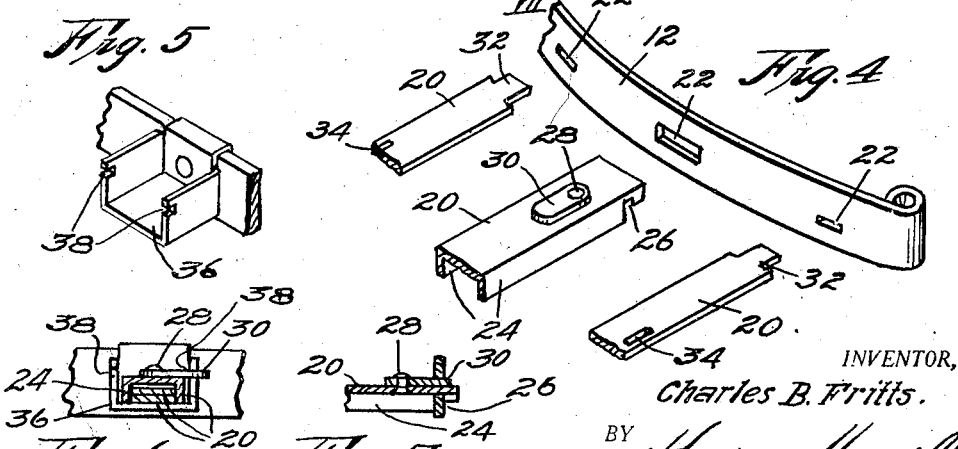
INVENTOR,
Charles B. Fritts.
BY Hovey & Hamilton,
ATTORNEYS.

Patented May 12, 1931

1,804,761

UNITED STATES PATENT OFFICE

CHARLES B. FRITTS, OF KANSAS CITY, KANSAS

BUMPERETTE TRUNK RACK

Application filed August 6, 1930. Serial No. 473,316.

This invention relates to luggage carriers particularly adapted for use in connection with automobiles and the primary object of invention is to provide a rack which may be formed by using the well known bumperettes of the automobile, together with a plurality of connecting bars which may be assembled with the bumperettes after the same have been moved to project rearwardly of the automobile and to positions substantially parallel to each other.

It is one of the primary objects of the invention to provide a trunk rack for automobiles which may be formed by swinging the bumperettes of the automobile about their pivotal connection adjacent one end thereof to a position where a number of connecting bars may be attached thereto to form a support for a trunk or similar luggage.

One of the salient features of the instant invention is the contemplation of a rack for automobiles which may be made up of the well known and standard bumperettes which are suitably joined together by a number of bars which act as supports for luggage which it is desired to carry.

A yet further object of the invention is to provide means whereby the plurality of bars forming the trunk rack may be carried when the rack is disassembled and the bumperettes are positioned to serve as such.

Minor objects of the invention including specific details of construction will appear during the course of the specification referring to the accompanying drawings, wherein Figure 1 is a top plan view of a rack for automobiles using the bumperettes as end members in accordance with this invention.

Fig. 2 is an edge elevation of the rack as shown in Fig. 1.

Fig. 3 is an enlarged vertical sectional view taken on line III—III of Fig. 1.

Fig. 4 is a fragmentary perspective view showing the parts about to be assembled.

Fig. 5 is a detail perspective view of the receiving brackets for the bars which is used to support the same when the rack is disassembled.

Fig. 6 is a vertical sectional view through the bars adjacent the receiving bracket looking toward the same, and Fig. 7 is a fragmentary detail view taken on line VII—VII of Fig. 3.

With reference at this time to the preferred form of the invention as illustrated in the accompanying drawings, wherein like reference characters refer to similar parts throughout the several views, the numeral 10 indicates the well known frame of an automobile which supports the bumperettes 12. In the manufacture of devices embodying this invention it is desirable to form a hinge connection 14 for the bumperette 12 at the end of frame 10 which will be strong enough to support any reasonable load which may be placed upon the hereinafter described rack. Through the intermediacy of pin 16 the bumperette 12 is allowed to swing from the normal position to the extended position as clearly shown in Fig. 1. Braces 18 are oftentimes provided as a part of the bumperette structure and the same are detachably secured to the two members of the bumperette 12 in many ways. In carrying out this invention it is desirable to have this connection formed of parts which are extremely easy to manipulate when detaching the braces 18 and bumperettes 12. After this connection has been broken by loosening the proper parts the two bumperettes 12 are swung to the extended position to receive a plurality of bars 20, one of which is preferably formed of channel iron to provide a tie between bumperettes 12 which precludes undesirable swinging movement about the pin 16.

To provide the necessary means for attaching bars 20 to the bumperette member 12 slots 22 may be provided through bumperette 12 which are of a size sufficient to receive the formed ends of bars 20. In the case of the bar 20 which is relied upon to secure rigidity the walls 24 of the same are cut away at the end to form a notch 26 in each of said walls respectively, which notch receives that portion of the bumperette 12 below the slot 22 as shown in Fig. 7. To preclude upward movement of bar 20, a locking device 30 is provided which is pivotally mounted thereon as at 28 so that the device may be swung into slot 22 as shown in Figs. 1 and 7. The other bars 20 which are not formed of channel metal are cut away to present a longitudinally extending tongue 32 which projects through the respective slot 22 to be held in such position by the bar 20 which is formed of channel iron. Obviously, any number of bars 20 may be used in forming a rack of this character, but it is desirable to use only enough to provide ample support for the luggage without adding any more weight than necessary to the assembled rack. The outside bars 20 should be provided with strap slots 34 which may be used to receive straps of any kind adapted to secure the luggage in place on the rack.

It is well known that the use of a trunk rack is comparatively rare and it is also known that when a folding trunk rack is extended for use it projects beyond the bumperettes which renders the same susceptible of damage. The bumperettes are practically valueless when the trunk rack is in use and it is with this thought in mind that the bumperettes are made a part of the trunk rack, when it is desired to attach such an accessory to the rear end of the automobile.

Manifestly, it is desired to have the parts of the trunk rack always accessible and to carry out this point of invention means have been provided for storing the bars 20 where they will not be in danger of damage nor in the way.

A pair of opposed brackets 36 carried by the frame 10 of the automobile receive the ends of bars 20 as shown in Fig. 6. Each of the side walls of these brackets 36 is formed to present a notch 38 into which may be moved the locking device 30 which effectively secures the bars against displacement. One of the main features of the invention is the relative width of the plain bars 20 and the channel bar which allows nesting as illustrated in Fig. 6. This form of storage insures protection against dust and the novel locking device which cooperates with the structure when the bars 20 are in the rack forming position as well as when in the stored position renders this specific form highly desirable, cheap to make and extremely durable.

The use of the swingable bumperettes 12 to form a trunk rack does not alter their strength or durability in any manner. The invention is adaptable for use with practically any form of bumperette and the rack may be built into the car as standard equipment or supplied as an accessory without a large amount of alteration or expense.

It is understood that many changes and modifications might be followed in constructing racks in accordance with this invention without departing from the spirit thereof or the scope of the appended claims.

What is claimed as new and desired to be secured by Letters Patent is:

1. A rack of the character described having end members swingable to serve as bumperettes when the rack is disassembled.

2. A rack of the character described comprising end members, a plurality of bars joining said members and detachably engaging the same and means swingably supporting the end members whereby the same may be moved to serve as bumperettes when the rack is disassembled.

3. A rack for automobiles comprising a pair of end members formed by swinging the bumperettes of said automobile to extend rearwardly, and a plurality of bars connecting said end members.

4. A rack for automobiles comprising a pair of spaced apart end members, swingable to serve as bumperettes when the rack is disassembled, a plurality of bars detachably engaging said end members and means formed by one of said bars to maintain said end members in the spaced relation.

5. A rack of the character described comprising a pair of spaced apart end members, a plurality of bars detachably connecting said end members and a locking device adjacent the end of one of said bars.

6. A rack of the character described comprising a pair of spaced apart end members, a plurality of bars detachably connecting said end members, one of said bars formed to maintain all of the bars against displacement when positioned out of the rack forming location.

7. A rack for automobiles comprising a pair of spaced apart end members formed by swinging the bumperettes of the automobile outwardly to relatively parallel positions, a plurality of bars detachably connecting said end members, a pair of opposed brackets carried by the frame of the automobile to receive said bars when the rack is disassembled.

8. A rack for automobiles comprising a pair of spaced apart end members formed by swinging the bumperettes of the automobile outwardly to relatively parallel positions, a plurality of bars detachably connecting said end members, a pair of opposed brackets carried by the frame of the automobile to receive said bars when the rack is disassembled, one of said bars having a locking device to engage coacting parts of the bumperette and bracket respectively to maintain the plurality of bars against displacement when in either the operative or inoperative position.

In testimony whereof, I hereunto affix my signature.

CHARLES B. FRITTS.